Patented Nov. 13, 1945

2,388,684

UNITED STATES PATENT OFFICE 2,388,684

INSECTICIDE

Samuel I. Gertler and Herbert L. J. Haller, Washington, D. C., assignors to United States of America as represented by Claude R. Wickard, Secretary of Agriculture, and his successors in office No Drawing. Application December 7, 1943, Serial No. 513,220

4 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This in a continuation in part of our copending application for patent, Serial No. 360,360, filed October 9, 1940.

This invention relates to improvements in materials for destroying or checking the growth or multiplication of living organisms, whether plant or animal which are economically injurious to man.

An object of the invention is to provide materials suitable for use as insecticides.

Another object of the invention is to provide a material for dusting or spraying delicate vegetation, such as bean plants, peach trees, and plants grown under glass, which will not cause injury to foliage.

Another object of the invention is to provide a material which is relatively nontoxic to man and domestic animals when taken by mouth, and which can be used in place of lead arsenate and other arsenicals for destroying insects, without leaving harmful residues on fruit and vegetables.

We have found that substances belonging to a certain class of organic compounds have a specific toxic effect upon insects, and our invention consists in the application of said substances to the destruction of insect pests.

The novel insecticides found by us belong to the class of organic compounds known as semicarbazones, and are formed by condensing ketones with semicarbazide. Suitable products according to this invention are semicarbazones having the formula:

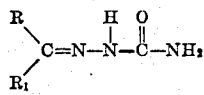

where either R or R₁ is an aryl group or both are aryl groups, either unsubstituted or substituted, the substituents being such as nitro, halogen, amino, hydroxy, etc.

The insecticidal material may be reduced to an impalpable powder by grinding and applied to vegetation either dry as a dust or made into a suspension and used as a spray. When applied as a spray in water, it may be desirable to incorporate wetting agents, such as sodium lauryl sulfate, or any derivative of sulfosuccinic acid and an alkyl aryl sulfate. Stickers may also be incorporated, such as casein, soy bean flour or fish oil. The spray may be made by mechanically suspending the impalpable powder or by first absorbing it in an appropiate solvent, such as acetone, methyl alcohol, or ethyl alcohol, and pouring the resulting solution into water, whereupon a fine colloidal suspension is obtained. The suspension may then be applied directly to the host plant or combined with a suitable wetting agent or adhesive, such as those mentioned above, and then sprayed.

The insecticidal material when used as a dust may be adsorbed on or mixed with a suitable diluent, such as clay, talc, bentonite, etc.

The insecticidal materials may also be employed in admixture with other known insecticides, such as pyrethrum, derris, nicotine, arsenicals, etc.

The value of these compounds as insecticides is shown by the following examples:

1. Acetophenone semicarbazone tested against newly hatched larvae of the European corn borer was practically as toxic as derris after a 72-hour period. When tested against newly hatched screwworm larvae by the "jar test" method, it was toxic at a concentration of 0.05%.

2. Benzophenone semicarbazone tested against newly hatched screwworm larvae was toxic at a concentration of 0.01%. When dusted or collard leaves and fed to the imported cabbage worm of the fifth instar, it showed a high mortality after 48 hours.

3. p-Chloroacetophenone semicarbazone gave practically the same percentage of kill after 48 hours as the same concentration of derris, against the newly hatched larvae of the European corn borer. It was somewhat more effective than lead arsenate against the codling moth. When used against the Hawaiian beet webworm of the fifth instar, it gave a 96% kill in 72 hours. Against the melon worm of the fourth instar it showed about the same toxicity as derris after 72 hours.

It is to be understood that the above-mentioned compounds are merely used as examples and that this invention is not restricted to such use. Also the above examples are not to be construed as limiting either the method of application of these novel insecticides or the kinds of insects to which they may be applied.

Having thus described our invention, we claim:

1. An insecticidal composition of matter comprising as its essential active ingredient benzophenone semicarbazone and a carrier therefor.

2. An insecticidal dust composition comprising benzophenone semicarbazone in the form of an impalpable powder admixed with a solid diluent.

3. An insecticidal spray composition comprising benzophenone semicarbazone suspended in a compatible liquid medium together with suitable spreading and sticking agents.

4. A method for destroying insects comprising subjecting the insects to the action of benzophenone semicarbazone.

SAMUEL I. GERTLER.
HERBERT L. J. HALLER.